United States Patent [19]
Nakamura

[11] Patent Number: 6,015,216
[45] Date of Patent: Jan. 18, 2000

[54] FISH TANK WITH ILLUMINATING LIGHT GUIDE DEVICE

[75] Inventor: Yasushi Nakamura, Narashino, Japan

[73] Assignee: Hirose Co., Ltd., Narashino, Japan

[21] Appl. No.: 08/984,767

[22] Filed: Dec. 4, 1997

[30]     Foreign Application Priority Data

Aug. 29, 1997  [JP]  Japan .................................... 9-273221

[51] Int. Cl.[7] .................................................. F21V 8/00
[52] U.S. Cl. .......................... 362/96; 119/267; 362/101; 362/562
[58] Field of Search ............................ 362/96, 101, 562, 362/560, 559; 119/267

[56]              References Cited

U.S. PATENT DOCUMENTS

| 3,749,901 | 7/1973 | Clough ................................. 362/101 X |
| 4,749,126 | 6/1988 | Kessener et al. .................... 362/101 X |
| 4,901,922 | 2/1990 | Kessener et al. ...................... 362/96 X |
| 5,067,059 | 11/1991 | Hwang ...................................... 362/101 |
| 5,165,778 | 11/1992 | Matthias et al. ......................... 362/101 |
| 5,546,289 | 8/1996 | Gordon .................................... 362/101 |
| 5,597,228 | 1/1997 | Boyle ................................... 362/101 X |

*Primary Examiner*—Laura K. Tso
*Attorney, Agent, or Firm*—Burgess, Ryan & Wayne

[57]                ABSTRACT

A water tank with an illuminating device comprises a source of light and a condenser positioned outside the water tank and below the bottom thereof, a light guide made of a transparent material to guide the condensed light upwards, with the top end of the light guide positioned above the level of water filled in the water tank, and a reflecting surface to reflect the guided light toward the water tank below. The water tank is illuminated from above without locating any illuminating device atop.

6 Claims, 5 Drawing Sheets

FISH TANK WITH ILLUMINATING LIGHT GUIDE DEVICE

BACKGROUND OF THE INVENTION

This invention relates to an improvement in an illuminating device for tanks for keeping seawater fish, freshwater fish, etc.

Generally, a source of light 3 for a water tank 1 to keep fish is attached to the top cover thereof as shown in FIG. 1(a) or suspended from above as shown in FIG. 1(b).

The illuminating device placed in such positions as shown in FIG. 1(a) and 1(b) may fall when maintenance or feeding is done or interfere with observation of the fish from above.

There is also an arrangement that places a source of light 3 in the lower side of a water tank 1 as shown in FIG. 1(c). While fish are watched from above, the light illuminates not the upper side but the lower side of fish. This type of illumination is therefore inferior from the viewpoint of lighting effect and aesthetic quality.

The object of this invention is to provide a water tank with an illuminating device that permits lighting from above without placing a source of light above the water tank by overcoming the shortcomings in the conventional illuminating device for water tanks.

SUMMARY OF THE INVENTION

To achieve the object of this invention described above, a water tank with an illuminating device according to this invention comprises a source of light and a condenser positioned outside the water tank and below the bottom thereof, a light guide made of a transparent material to guide the condensed light upwards, with the top end of the light guide positioned above the level of water filled in the water tank, and a reflecting surface to reflect the guided light toward the water tank below.

DETAILED DESCRIPTION OF THE INVENTION

The illuminating device of this invention comprises a source of light 3 positioned outside of a water tank 1 and below the bottom thereof. A condenser 4 gathers light and directs it to a light guide 2 made of a transparent material and extending upward, as shown in FIG. 2(a).

Figure 1A:
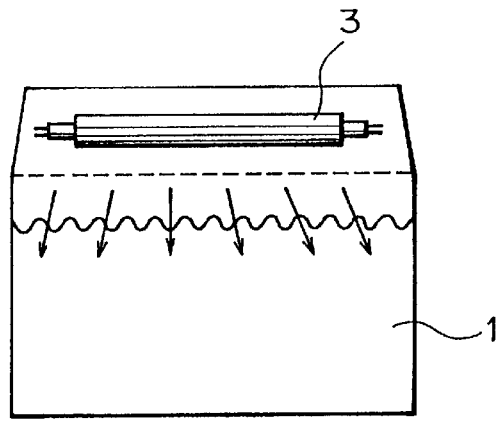
FIG. 1 show side elevations of the construction of conventional illuminating devices; (a) and (b) show the illuminating devices located above the water tank and (c) shows one located below the water tank.
Figure 1B:
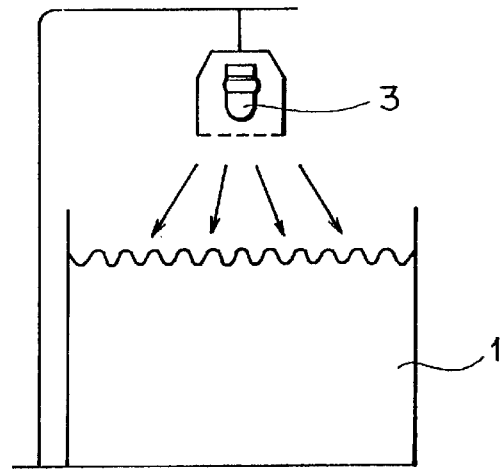
Figure 1C:
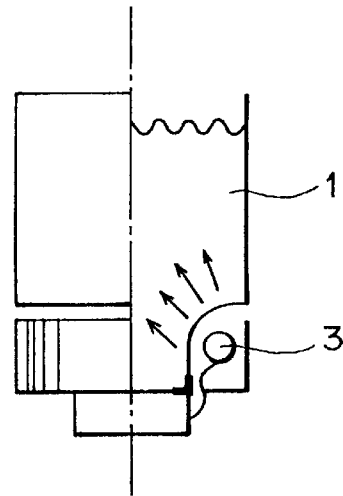
Figure 2A:
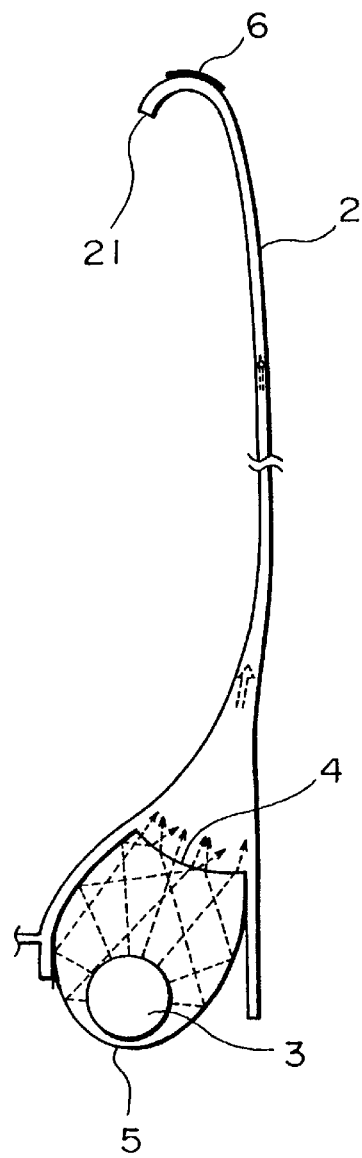
FIG. 2 show the basic construction of a illuminating device according to this invention; (a) shows the overall construction of the illuminating device and (b) shows a variation of the condenser different from the one shown in (a).

The light guide 2 serves also as a condenser lens 4 that is formed at one end of the transparent member as shown in FIG. 2(a). This invention is by no means limited to the embodiment just described. For example, the condenser 4 may be positioned away from the light guide 2, as shown in FIG. 2(b).

To achieve efficient gathering of light, a reflecting surface 5 should be provided around the light source 3 so that the light from the reflected light is also gathered, as shown in FIG. 2(a) and (b).

Figure 2B:
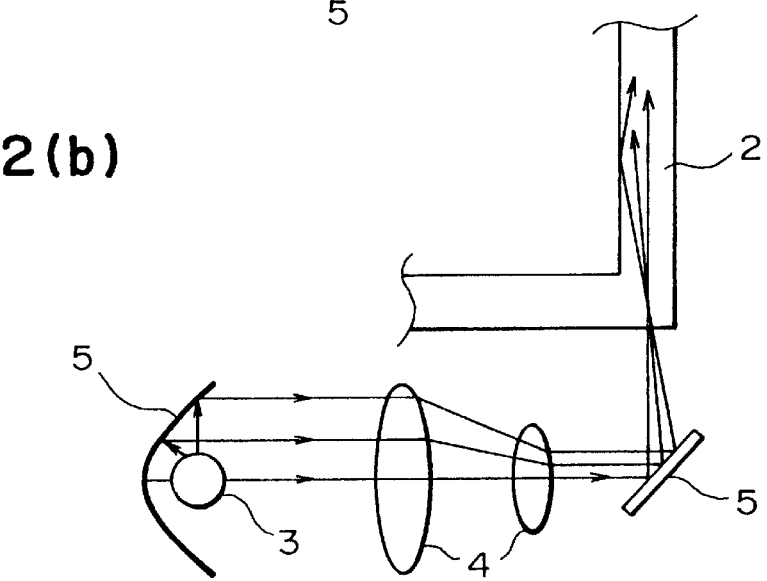

The reflecting surface 5 shown in FIG. 2(b) is parabolically curved in cross section and the focus of the parabolic reflecting surface coincides with the center of the light source 3. Then, the beams of light reflected by the reflecting surface 5 are horizontally directed to the condenser lens 4, thus assuring efficient gathering of light.

The light beams directed to the light guide 2 made of the transparent member travel upward therethrough. Although the traveling light beams may hit the wall of the transparent member, the incidence angle of such light beams with respect to the wall can be made larger than the critical angle that is equal to the minimum angle required for the light beams to become refracted outside by proper design consideration. In most cases, therefore, the light beams continue the upward travel while being reflected by the wall of the transparent member rather than refracted outside.

A reflecting surface 6 is provided at the top of the light guide 2. In the embodiment shown in FIG. 2(a), the upper part of the transparent member is gradually bent so that a light-releasing end 21 droops, and the reflecting surface 6 is provided on the outside surface of the curved top.

The light reflected by the reflecting surface 6 of this profile is directed downward from the curved surface of the transparent member or the light-releasing end 21 at the tip thereof.

Figure 3A:
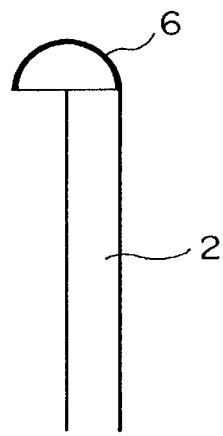
FIG. 3 show the cross-sections of reflecting surfaces at the top of the illuminating device that are different from the one shown in FIG. 2(a); (a) shows a reflecting surface provided on the outer up-looking surface of a hemisphere, (b) shows a reflecting surface formed by positioning a mirror away from the transparent member, and (c) shows a reflecting surface provided on the inner down-looking surface of a hemispherical hollow positioned away from the transparent member.

The profile of the reflecting surface 6 coated on the top of the transparent member is not limited to the one shown in FIG. 2(a). For example, the reflecting surface may be coated on the hemispherical surface of the transparent material as shown in FIG. 3(a).

Figure 3B:
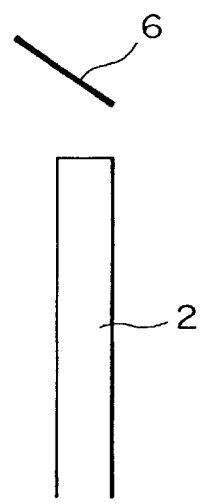

Furthermore, the reflecting surface 6 may be positioned away from the transparent member as shown in FIG. 3(b). Even this reflecting surface directs the light to the water tank located therebelow.

Figure 3C:
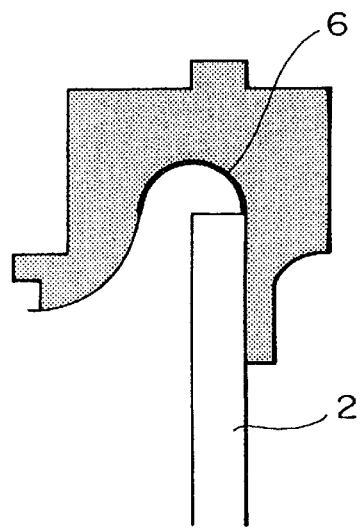

In addition to the one shown in FIG. 3(b), the reflecting surface 6 may also be provided on the inner down-looking surface of a hemispherical hollow positioned away from the transparent member as shown in FIG. 3(c).

According to this invention, as is obvious from the above, the light guide 2 made of a transparent material guides the light from the light source 3 to above the water tank 1 and the light reflected by the reflecting mirror 6 atop illuminates the surface of water in the water tank 1 located below.

The transparent material may be selected from plastic, glass, crystallized quartz and other transparent substances.

The transparent material may be either colored or colorless. When the transparent material is colored, the light colored thereby illuminates the water tank 1.

The reflecting surface 6 at the top of the light guide 2 and the reflecting surface 5 near the light source are usually formed by vapor deposition of aluminum, but not limited thereto.

Embodiments

Figure 4:
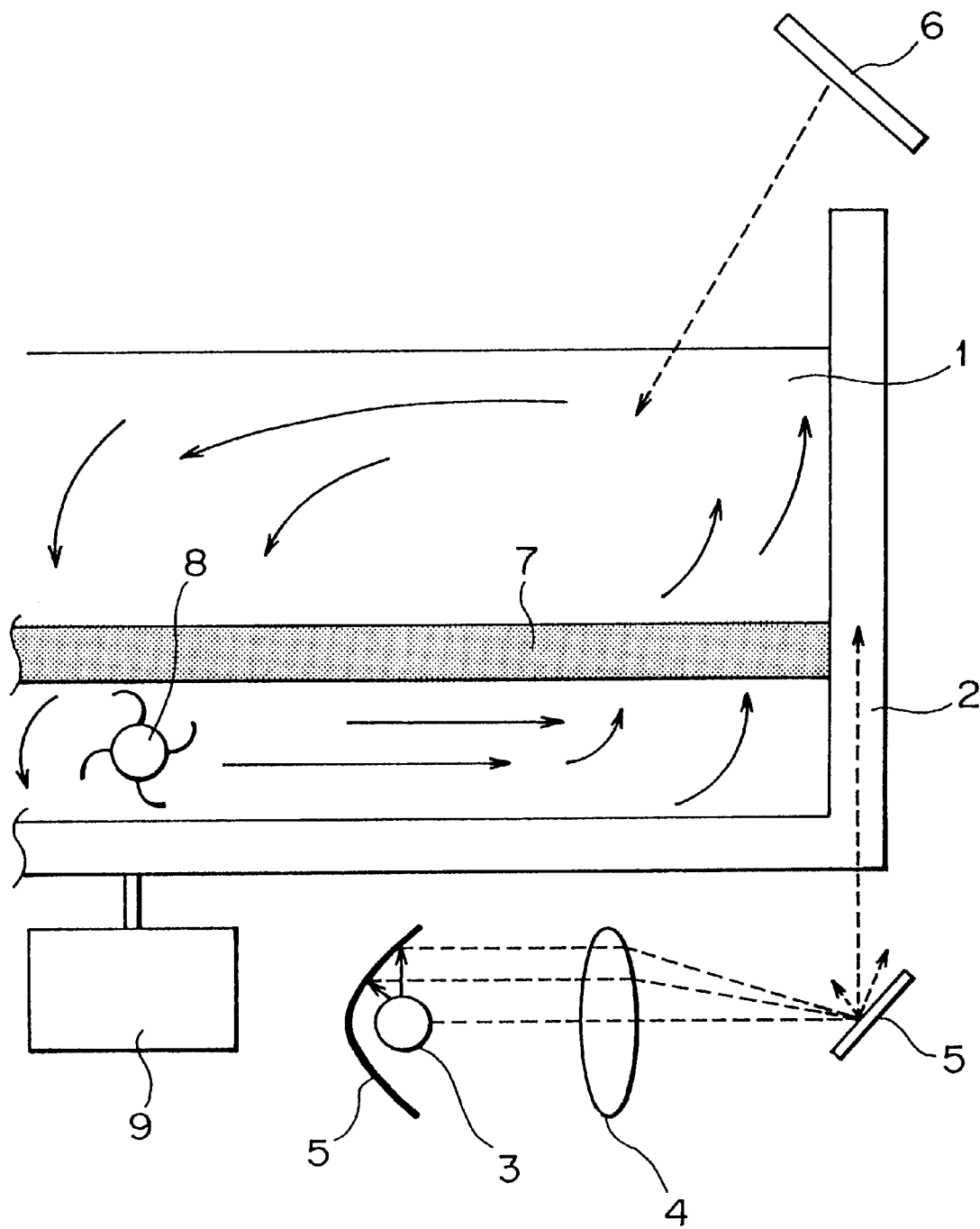
FIG. 4 is a cross-sectional side elevation of a first embodiment.

In a first embodiment, the light guide 2 made of a transparent material serves also as the wall of the water tank as shown in FIG. 4. (The transparent light guide shown in FIG. 4, as in the embodiment shown in FIG. 2(*a*), serves also as the condenser 4 and forms a Fresnel lens.

Light beams from the light source 3 travel upward through the wall of the water tank and are reflected by the reflecting mirror 6 on top to the surface of water in the water tank 1 positioned below.

Conventional water tanks usually have a water circulating device located on top thereof. By contrast, the first embodiment described above permits locating a propeller to circulate water in the water tank 1 below a filter layer 7 and a motor 9 to rotate the propeller outside the water tank 1 and below the bottom thereof. The water tank having neither a light source 3 and a circulating device on top is easy to service and neat to look at.

Figure 5:
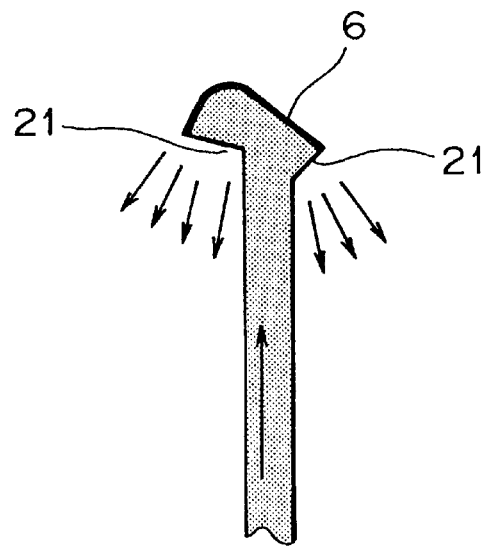
FIG. 5 is a cross-sectional side elevation of a second embodiment.

A second embodiment has the reflecting surface 6 provided on the inclined surfaces on both sides (front and back) of the highest point of the transparent light guide, as shown in FIG. 5.

This reflecting surface scatters light widely. When the transparent material forms the wall of the water tank, the water tank 1 serves also as a desk lamp, with one of the light releasing ends 21 releasing light for illumination.

Figure 6:
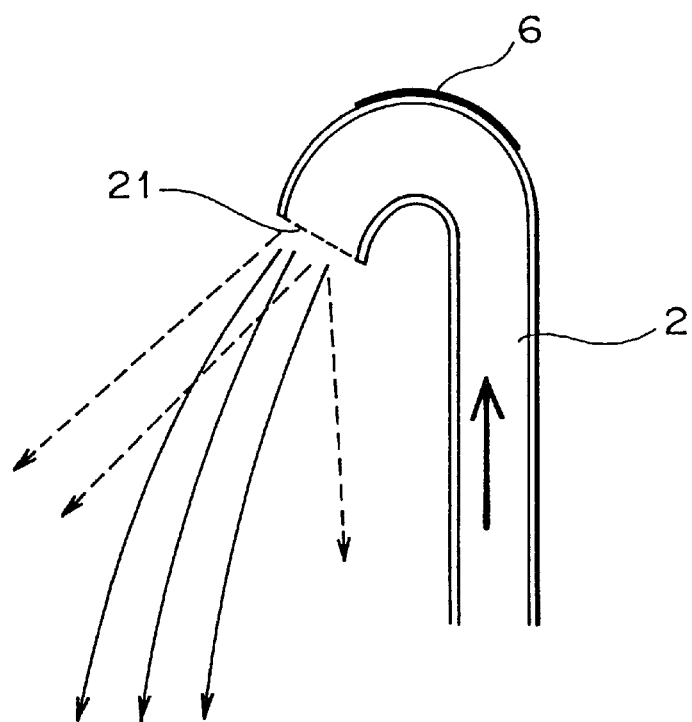
FIG. 6 is a cross-sectional side elevation of a third embodiment.

A third embodiment has a hollow transparent light guide as shown in FIG. 6. The propeller 8 sends water upward from below the transparent light guide. The water then falls from the light releasing end provided at the top of the light guide.

The third embodiment that sends water from below the transparent light guide requires a separate condenser 4 as shown in FIG. 2(*b*) because the transparent light guide does not serve as the condenser 4 as shown in FIG. 2(*a*).

The light-releasing end 21 of the third embodiment allows water to fall (as indicated by solid arrows) and releases light for illumination (as indicated by dotted arrows). The varying motion of the falling water affects the direction of illuminating light, thereby adding dynamic variations to illumination. The illumination thus obtained produces fantastic effects unobtainable from conventional illumination.

As can be understood from the above, this invention permits illuminating water tanks from above without providing any illuminating device on top thereof. Thus, this invention affords ease of maintenance, beautiful appearance and efficient illumination.

Additional merits can be obtained by adding the features incorporated in the first, second and third embodiments described before.

Thus, this invention introduces an epoch-making and extremely useful improvement in the illumination of water tanks.

What is claimed is:

1. A water tank with an illuminating device comprising: a source of light and a means for directing the light positioned outside of the water tank and below a bottom of the tank, arranged to illuminate a lower end of a light guide made of transparent material, to guide the light upwards, an upper part of the light guide positioned above a level of water in the water tank, and a reflecting surface arranged to reflect the guided light toward the water when the water tank contains water.

2. A water tank with an illuminating device according to claim 1, wherein an upper part of the light guide is gradually curved so that a light-releasing end at a tip of the light guide looks downward and a reflecting surface is formed on an outer surface of the curved upper part of the light guide.

3. A water tank with an illuminating device according to claim 1, wherein the upper part of the light guide is provided with two reflecting surfaces whereby light is reflected to the front and back of the light guide.

4. A water tank with an illuminating device according to claim 1, wherein the light guide comprises a frame of the water tank.

5. A water tank with an illuminating device according to claim 1, which further comprises a circulating means to circulate water in the water tank arranged below a floor of a sand layer and a motor to operate the circulating means arranged outside the water tank and below the bottom thereof.

6. A water tank with an illuminating device according to claim 1, wherein the transparent light guide comprises a hollow space on the inside thereof and water from the water tank is circulated through the hollow space in the light guide.

\* \* \* \* \*